(12) United States Patent
Sekiya

(10) Patent No.: US 10,017,208 B2
(45) Date of Patent: Jul. 10, 2018

(54) VEHICLE FRONT STRUCTURE

(71) Applicant: HONDA MOTOR CO., LTD., Minato-Ku, Tokyo (JP)

(72) Inventor: Takayuki Sekiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 15/509,364

(22) PCT Filed: Jun. 29, 2015

(86) PCT No.: PCT/JP2015/068742
§ 371 (c)(1),
(2) Date: Mar. 7, 2017

(87) PCT Pub. No.: WO2016/038987
PCT Pub. Date: Mar. 17, 2016

(65) Prior Publication Data
US 2017/0253272 A1 Sep. 7, 2017

(30) Foreign Application Priority Data

Sep. 12, 2014 (JP) .................................. 2014-186389

(51) Int. Cl.
*B62D 21/15* (2006.01)
*B62D 25/08* (2006.01)
(Continued)

(52) U.S. Cl.
CPC ............ *B62D 21/152* (2013.01); *B60R 19/02* (2013.01); *B62D 25/084* (2013.01); *B62D 25/085* (2013.01); *B62D 27/02* (2013.01)

(58) Field of Classification Search
CPC .... B62D 21/15; B62D 21/152; B62D 25/082; B62D 25/084; B62D 25/085
(Continued)

(56) References Cited

U.S. PATENT DOCUMENTS 8,684,451 B1* 4/2014 Park ...................... B62D 25/08
296/203.02
9,004,576 B2* 4/2015 Sakakibara .......... B62D 25/085
293/133
(Continued)

FOREIGN PATENT DOCUMENTS

JP 2009-023424 A 2/2009
JP 2013-193571 A 9/2013
(Continued)

OTHER PUBLICATIONS

International Search Report from PCT/JP2015/068742 with English translation thereof.

*Primary Examiner* — Jason S Daniels
(74) *Attorney, Agent, or Firm* — Carrier Blackman & Associates, P.C.; Joseph P. Carrier; Fulchand P. Shende

(57) ABSTRACT

A vehicle front structure includes front side frames of right and left extending over a front-back direction of a vehicle, upper members provided in an outer side in a vehicle width direction of the front side frames and extending over the front-back direction of the vehicle; and connection frame extending over a space between a front end portion of the front side frame and a front end portion of the upper member, the connection frame includes; a diagonal reinforcement member extending forward from an outer side wall surface in the vehicle width direction of the front side frame while inclining toward the outer side in the vehicle width direction; a box-shaped reinforcement portion extending over a space between an inclination surface on the outer side of the diagonal reinforcement member and an inner side wall surface of the upper member and having a closed cross section.

8 Claims, 8 Drawing Sheets

(51) Int. Cl.
*B60R 19/02* (2006.01)
*B62D 27/02* (2006.01)

(58) Field of Classification Search
USPC .......................... 296/187.09, 187.1, 193.09
See application file for complete search history.

(56) References Cited

U.S. PATENT DOCUMENTS

| | | |
|---|---|---|
| 2013/0241233 A1 | 9/2013 | Ohnaka et al. |
| 2014/0008923 A1 | 1/2014 | Han et al. |
| 2014/0035325 A1* | 2/2014 | Naito .................. B62D 25/085 |
| | | 296/203.02 |
| 2014/0062106 A1 | 3/2014 | Han |
| 2015/0183468 A1* | 7/2015 | Shirooka .............. B62D 21/155 |
| | | 296/187.1 |

FOREIGN PATENT DOCUMENTS

| | | |
|---|---|---|
| JP | 2013-193572 A | 9/2013 |
| JP | 2014-012428 A | 1/2014 |

\* cited by examiner

VEHICLE FRONT STRUCTURE

TECHNICAL FIELD

The present invention relates to a vehicle front structure. Priority is claimed on Japanese Patent Application No. 2014-186389, filed Sep. 12, 2014, the contents of which are incorporated herein by reference.

BACKGROUND ART

Conventionally, a vehicle front structure including front side frames of right and left extending over a front-back direction of a vehicle, upper members being provided in an outer side in a vehicle width direction of the front side frames and extending over the front-back direction of the vehicle, and a connection frame linking between front ends of the front side frame and the upper member with each other is known (for example, see Patent Document 1).

In the structure of the Patent Document 1, a taper portion which inclines so as to be positioned on the front side frame side as it goes backward from a front end of the connection frame in order to transmit a collision load to the front side frame in addition to the upper member in case of a narrow offset collision in which such collision objects as a car coming from the opposite direction collides at an outer position in a vehicle width direction than that of the front side frame.

PRIOR ART DOCUMENTS

Patent Documents

Japanese Patent Application, Publication No. 2013-193571

SUMMARY OF INVENTION

Problems to be Solved by the Invention

According to the art described above, as connecting between the front side frame and the upper member so as to withstand a load from the front direction, it is necessary to connect one end of a diagonal connection member (the taper portion) on a side surface of the front side frame which is located backwardly from a front end of the front side frame by a certain distance and also to connect the other end of the diagonal connection member at the front end of the upper member.

However, if such a structure is to be realized by a single diagonal connection member, the size of the diagonal connection member is increased and causes a disadvantage in weight. Also, increasing in size of the connection frame including the diagonal connection member causes a rear space of the connection frame small. Thus, it is difficult to secure a rear space of the connection frame to board automotive components such as resonators.

An aspect of the present invention is to provide a vehicle front structure including a connection frame linking between front ends of the front side frame and the upper member with each other, which enables to transmit the collision load input to the upper member even more to the front side frame and also to secure the rear space of the connection frame.

Means for Solving the Problems

As a means to solve the above-mentioned problems, the aspect of the present invention employs followings;

(1) A vehicle front structure of an aspect of the present invention includes: front side frames of right and left extending over a front-back direction of a vehicle; upper members being provided in an outer side in a vehicle width direction of the front side frames and extending over the front-back direction of the vehicle; and a connection frame extending over a space between a front end portion of the front side frame and a front end portion of the upper member, wherein the connection frame includes; a diagonal reinforcement member extending forward from an outer side wall surface in the vehicle width direction of the front side frame while inclining toward the outer side in the vehicle width direction; a box-shaped reinforcement portion extending over a space between an inclination surface on the outer side in the vehicle width direction of the diagonal reinforcement member and an inner side wall surface in the vehicle width direction of the upper member and having a closed cross section.

(2) In the aspect of the above mentioned (1), the vehicle front structure may further include: a front bumper member configured to be connected to the front end portion of the front side frame, wherein the connection frame includes; a front portion reinforcement member extending over a space between the front end portion of the front side frame and the front end portion of the upper member, the front portion reinforcement member is configured to be a front portion wall surface provided along the vehicle width direction of the box-shaped reinforcement portion; the diagonal reinforcement member includes; a flange bent from a front end portion of the diagonal reinforcement member toward an inner side in the vehicle width direction and configured to be joined to the front portion reinforcement member.

(3) In the aspect of the above mentioned (1) or (2), the vehicle front structure may further includes: a rear portion reinforcement member configured to be a rear portion wall surface provided along the vehicle width direction of the box-shaped reinforcement portion; wherein the rear portion reinforcement member includes a rear portion bead shape extending in a horizontal direction, the diagonal reinforcement member includes a diagonal bead shape extending in the horizontal direction, the rear portion bead shape and the diagonal bead shape are disposed so as to continue in a connecting portion of the rear portion reinforcement member and the diagonal reinforcement member.

(4) In any one of the aspects of the above mentioned (1) to (3), the vehicle front structure may further include: an upper portion reinforcement member extending over a space between an outer side portion in the vehicle width direction of the front side frame and an inner side portion of the vehicle width direction of the upper member, wherein the upper portion reinforcement member is configured to be an upper portion wall surface of the box-shaped reinforcement portion, the inner side portion of the upper portion reinforcement member and the outer side portion of the front side frame are fastened by a bolt.

Advantageous Effects of Invention

According to the aspect of the invention (1) described above, when a collision input is given to the front end portion of the upper member at the time of narrow offset collision, the connection frame transmits the load to the front side frame while being bent like falling backward, and the front side frame absorbs the collision load. In this way, as the connection frame is given strength by the diagonal reinforcement member and the box-shaped reinforcement portion, deformation thereof is restrained to a maximum extent, and a large amount of load is transmitted to the front side frame. Thus, it is possible to enhance an impact absorption characteristic of a front portion of a vehicle body. Also it is possible to enhance a layout flexibility of automotive components as being possible to effectively utilize the rear space of the connection frame as a component disposition space, compared to a case in which a diagonal connection member laid between a side surface of the front side frame and a front end of the upper member is used.

According to the aspect of the invention (2) described above, the flange of the front end portion of the diagonal reinforcement member is joined to the front end portion of the front side frame, that is, a connecting place of the front bumper member which receive the input at the time of a front collision, by being bent toward an inner side in the vehicle width direction. In this way, the flange contributes to support the load input in a rather offset manner from the front bumper member to the front portion reinforcement member. And accordingly, it is possible to transmit the load to the front side frame via the diagonal reinforcement member effectively.

According to the aspect of the invention (3) described above, as the diagonal reinforcement member and the rear portion reinforcement member are provided with bead shape extending in a horizontal direction, corresponding with each other, the strength of the diagonal reinforcement member and the rear portion reinforcement member itself is enhanced. Also, the diagonal reinforcement member is hard to buckle, and the rear portion reinforcement member is hard to break at the connecting portion with the diagonal reinforcement member against both of a compression load in an extending direction of the diagonal reinforcement member and a load in the falling direction of the upper member side of the connection frame backward and toward the inner side in the vehicle width direction when the load by a front collision is applied from a front direction. And accordingly, it is possible to restrain deformation of the connection frame to a maximum extent.

According to the aspect of the invention (4) described above, the connecting portion of the front side frame and the connection frame, which is a starting point of falling of the connection frame backward is combined by bolt fastening of higher fixing strength than welding in general. In this way, the upper portion reinforcement member is hard to be stripped off from the front side frame. And accordingly, it is possible to provide sufficient strength to the connection frame for the front collision load including the load of falling backward.

DESCRIPTION OF EMBODIMENT

Figure 1:
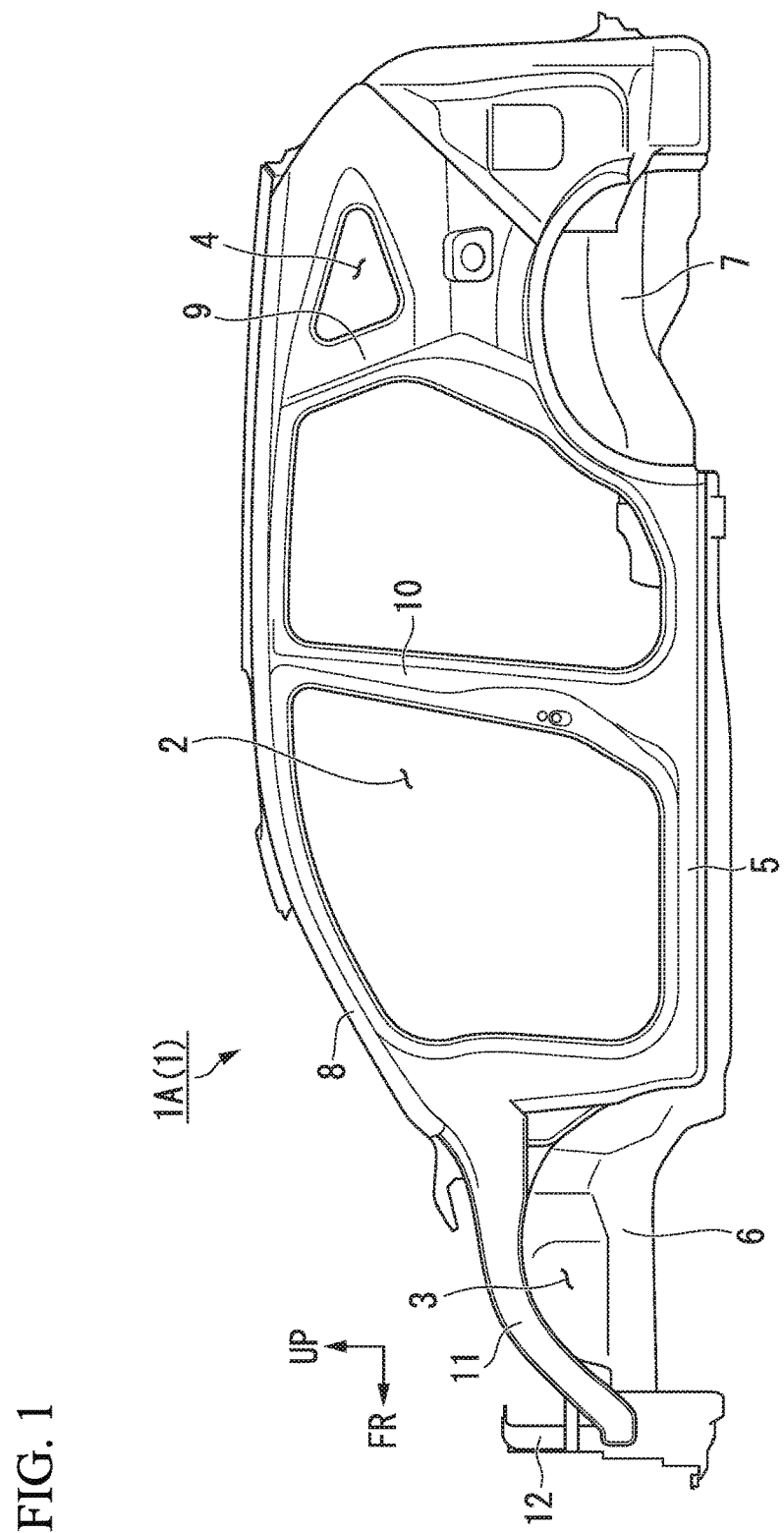
FIG. 1 is a left side view showing a vehicle body of a vehicle according to an embodiment of the present invention.

Hereinafter, an embodiment of the present invention will be described with reference to the accompanying drawings. Directions in the following description such as front, back, right and left, etc. are identical to those directions of a vehicle to be described below unless otherwise specified. In addition, in appropriate places in the drawings used in the following description, an arrow FR showing a forward direction with respect to a vehicle, an arrow LH showing a leftward direction with respect to the vehicle, an arrow UP showing an upward direction with respect to the vehicle are provided.

A vehicle body 1A of a vehicle 1 of the present embodiment is shown in FIG. 1. In a front side of the vehicle 1, an engine room 3 is disposed. Between an occupant room 2 and the engine room 3, it is divided by a front portion dividing wall not shown in the drawings. In the back of the occupant room 2, a vehicle room 4 communicating with the occupant room 2 is formed.

Side sills 5 which are frame members along a front-back direction of the vehicle are respectively disposed lower than side portions of both right and left sides of the occupant room 2. Between the side sills 5 of right and left, a floor tunnel not shown in the drawings, extending along the front-back direction in the center of right and left direction of the vehicle, and a plurality of cross members not shown in the drawings, extending out in a vehicle width direction (the right and left direction of the vehicle), linking between the side sills 5 of right and left and the floor tunnel are disposed.

In front of the side sills 5 of right and left, front side frames 6 of right and left continue, extending in the front-back direction of the vehicle while being displaced upward with respect to the side sill 5 and toward an inner side of the vehicle width direction.

In the back of the side sills 5 of right and left, rear side frames 7 of right and left continue, extending in the front-back direction of the vehicle while being displaced upward with respect to the side sill 5 and toward an inner side of the vehicle width direction. In the front side of the occupant room 2, front pillars 8 of right and left stand up, and in the back side of the occupant room 2, rear pillars 9 of right and left stand up. Between the front pillar 8 and the rear pillar 9, a center pillar 10 is disposed.

Hereinafter, description will be made with reference to the left front portion of the vehicle body shown in FIG. 2 to FIG. 8, and the front portion of the vehicle body is configured to be left-right symmetrical.

Figure 2:
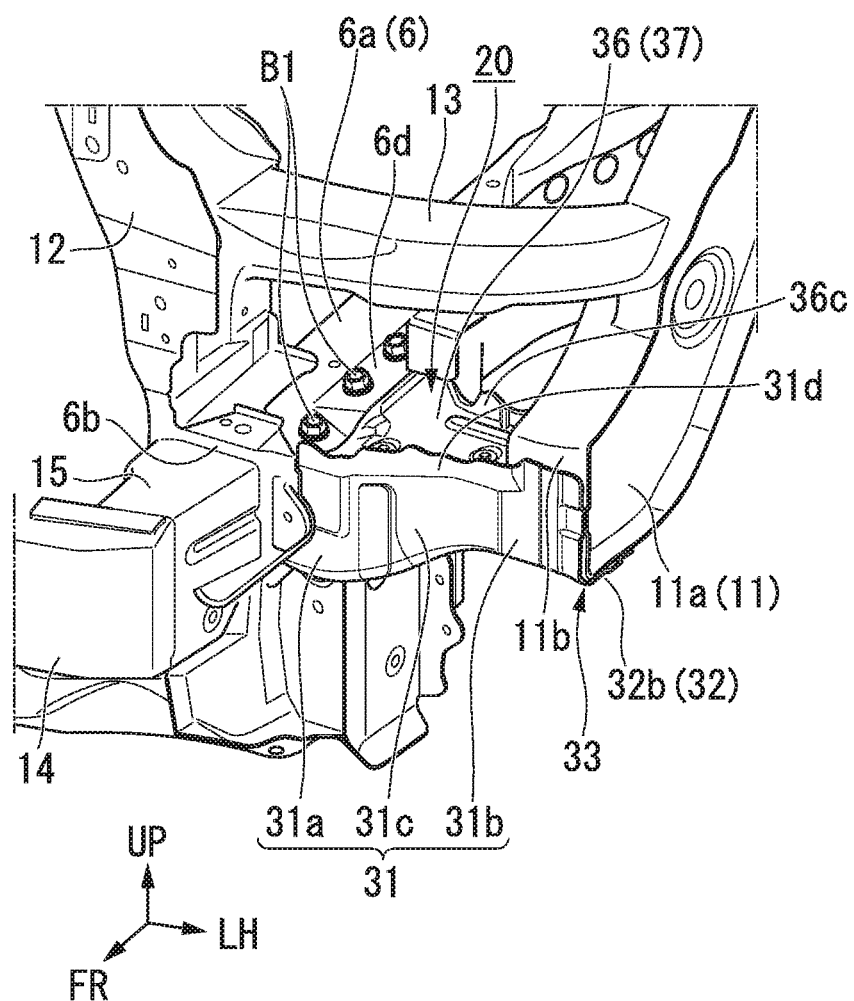
FIG. 2 is a perspective view showing a left front portion of the vehicle body seen from upper, left and front direction.
Figure 3:
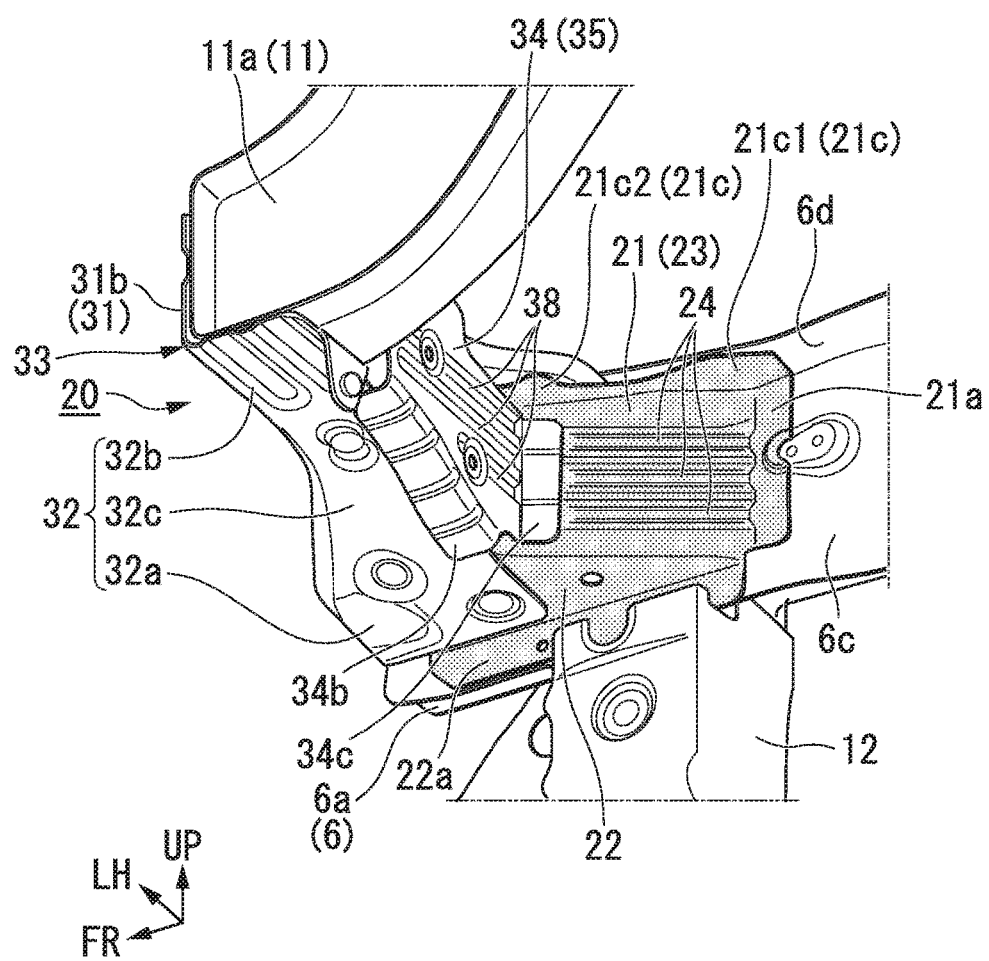
FIG. 3 is a perspective view showing a left front portion of the vehicle body seen from lower, left and back direction.
Figure 4:
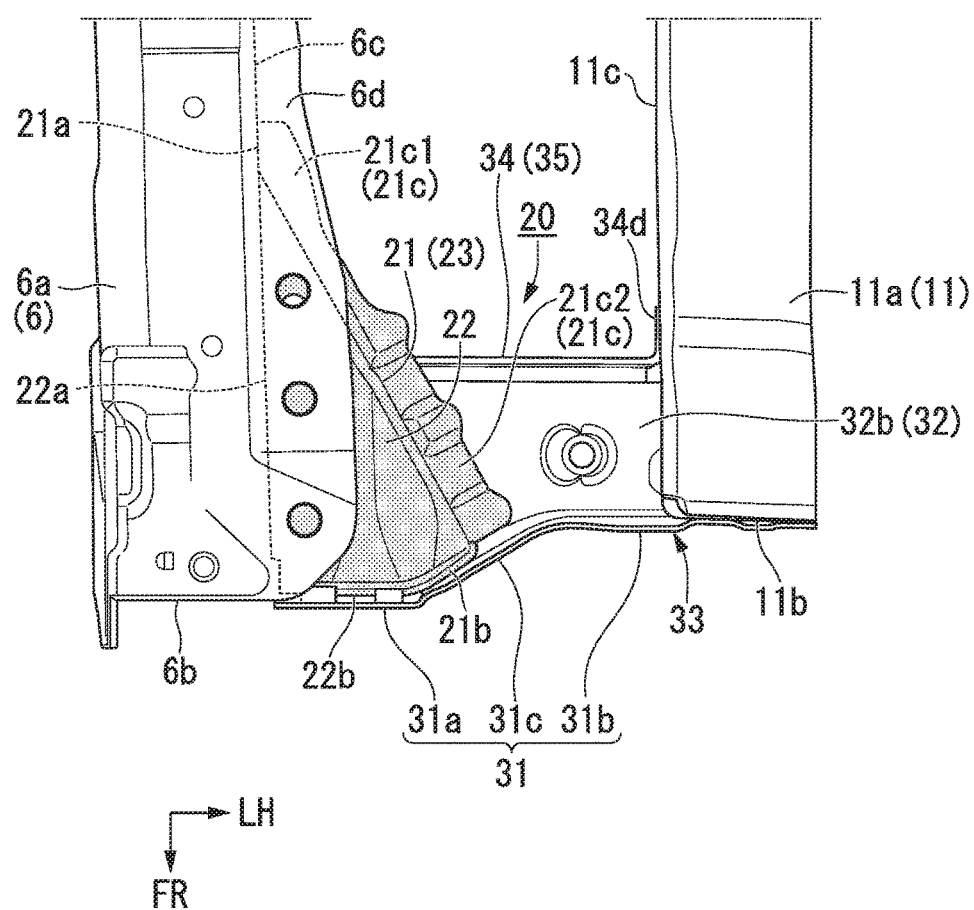
FIG. 4 is a top view showing a connection frame provided on the left front portion of the vehicle body in a state where an upper portion reinforcement member is removed.
Figure 5:
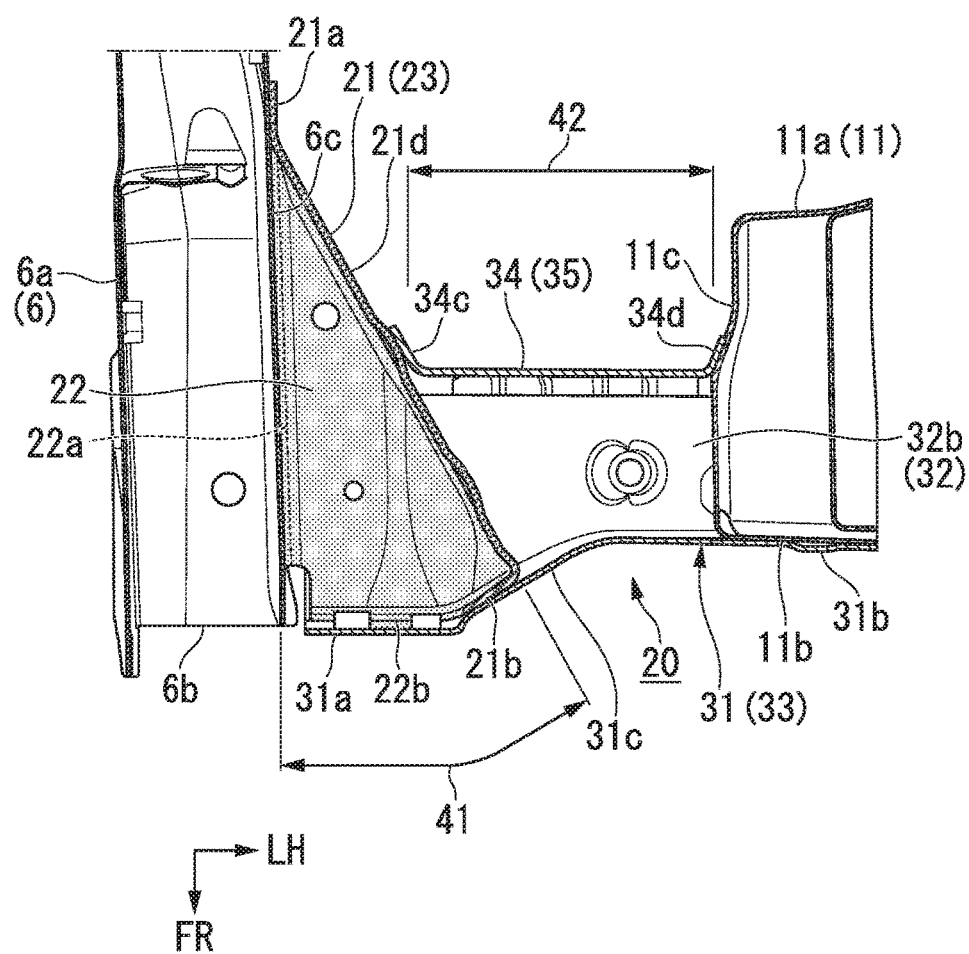
FIG. 5 is a cross sectional view along a horizontal plane passing through a middle point in an up-down direction of the connection frame provided at the left front portion of the vehicle body.
Figure 6:
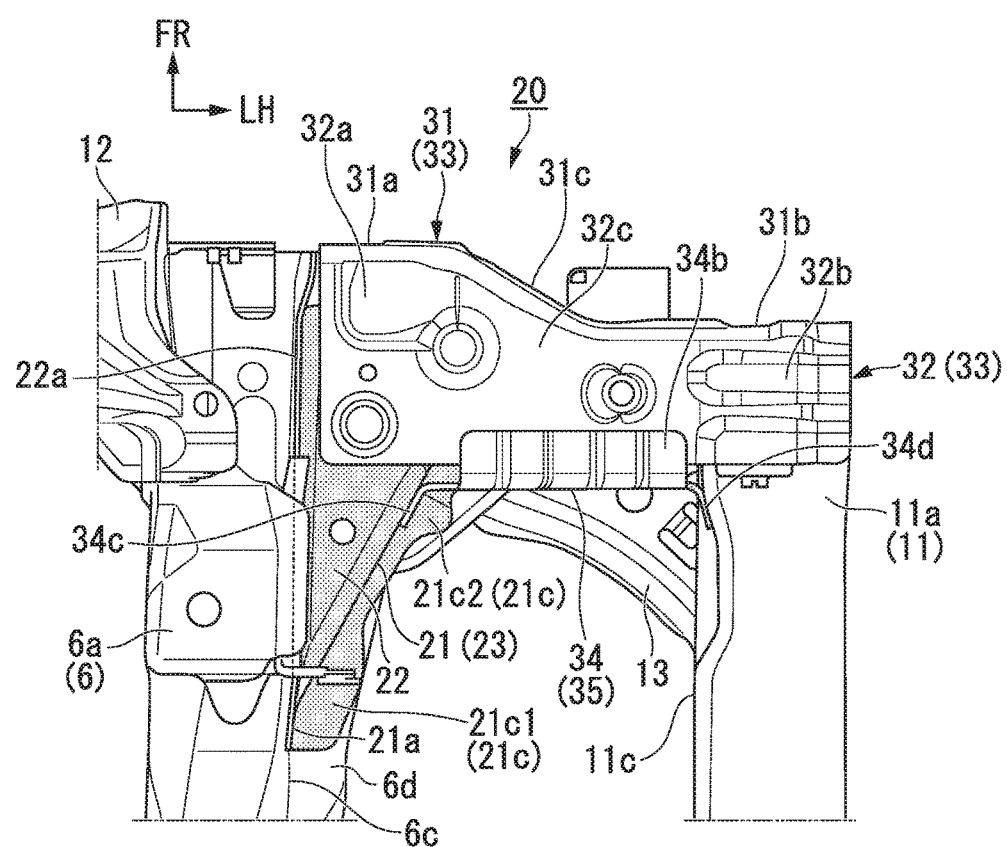
FIG. 6 is a bottom view showing the left front portion of the vehicle body.
Figure 7:
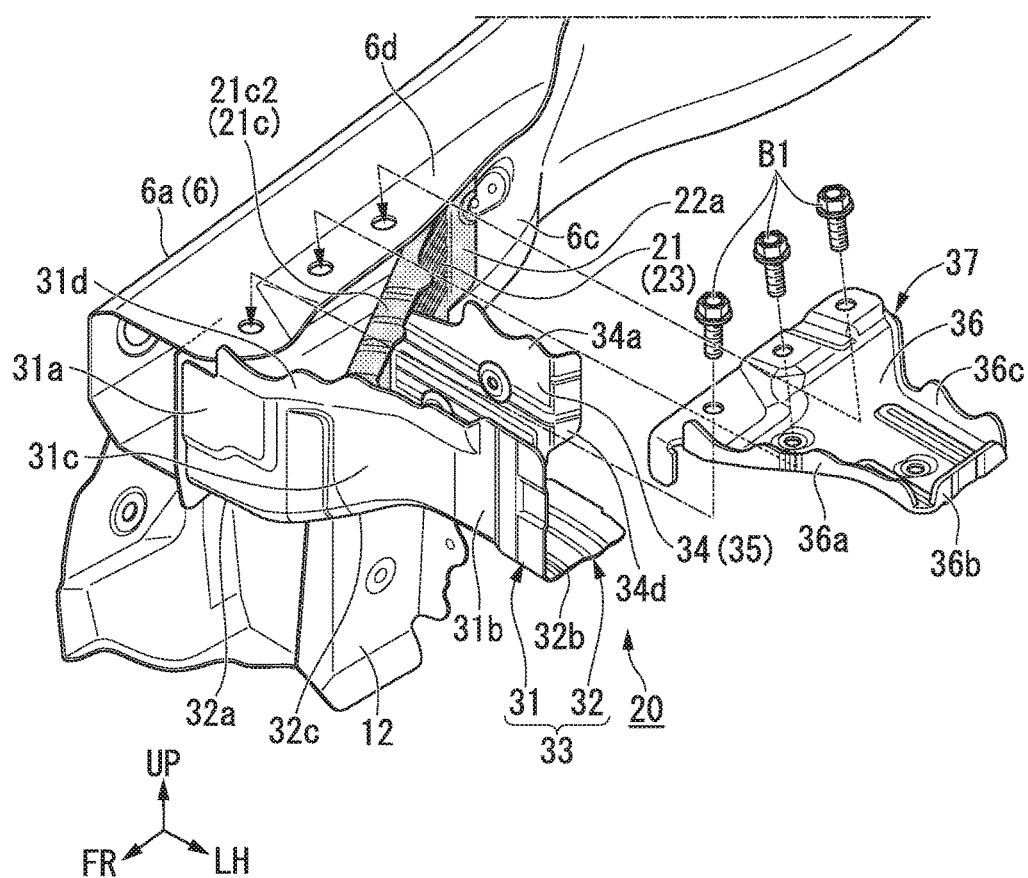
FIG. 7 is a perspective view showing the connection frame of the left front portion of the vehicle body seen from upper, left and front direction in a state where a part thereof is disassembled.
Figure 8:
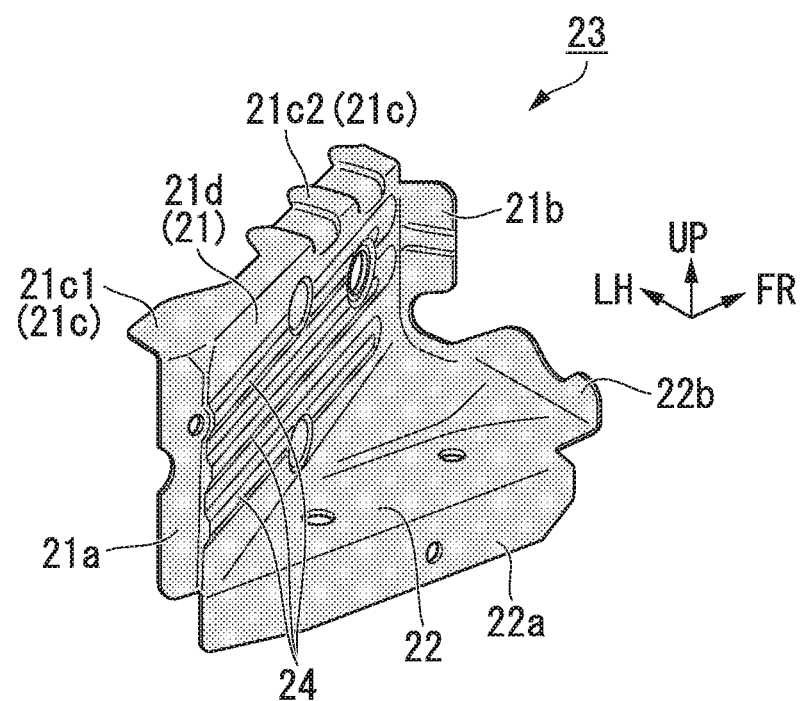
FIG. 8 is a perspective view showing a diagonal reinforcement member of the connection frame seen from upper, right and back direction.

As shown in FIG. 2, in the front portion of the vehicle body, front side frames 6 of right and left extending over a front-back direction of a vehicle, upper members 11 being provided in an outer side in a vehicle width direction of the front side frames 6 and extending over the front-back direction of the vehicle, and connection frames 20 extending over spaces between front end portions 6a of the front side frames 6 and front end portions 11a of the upper members 11 are included.

The front side frame 6 is a hollow frame member extending in the front-back direction of the vehicle, having a rectangular-like closed cross section. The front side frame 6, for example, is formed by integrally joining an outer member and an inner member extending in the front-back direction of the vehicle. In a track of the front side frame 6 in the front-back direction of the vehicle, bending points are formed arbitrarily. The front side frame 6 absorbs collision energy (collision load) while yielding to bend by receiving the collision load at the time when the front portion of the vehicle body collides with a car coming from the opposite direction or the like.

In an inner side in the vehicle width direction of the front side frame 6, an outer side portion of a front bulk head 12 which is configured to support a radiator or the like is supported. Between an upper side of the outer side portion of the front bulk head 12 and a front portion of the upper member 11, a front bulk head side 13 is laid. In the front end 6b of the front side frame 6, a front bumper beam 14 is supported via a bumper beam extension 15.

The upper member 11 is a hollow frame member extending in the front-back direction of the vehicle, having a rectangular-like closed cross section. And the upper member 11, for example, is formed by integrally joining an outer member and an inner member extending in the front-back direction of the vehicle. The upper member 11 has the front end portion 11a disposed in the outer side in the vehicle width direction of the front end portion 6a of the front side frame 6. The upper member 11 extends from the front end portion 11a in a diagonal upper, right and back direction and then curves extending in a backward direction, and then continues to a lower end portion of the front pillar 8. The front end 11b of the upper member 11 is positioned slightly upper backward from where the front end 6b of the front side frame 6 is positioned. In addition, the front end portion 6a of the front side frame 6 and the front end portion 11a of the upper member 11 include a range of an extent in which a member laid between over the front end 6b and the front end 11b (the connection frame 20) is attached.

Hereinafter, description is made with reference to FIG. 3 to FIG. 5 and FIG. 8. The connection frame 20 includes a diagonal reinforcement member 23 having an inclination wall 21. The inclination wall 21 extends from an outer side wall surface 6c in the outer side in the vehicle width direction of the front side frame 6, inclining in the outer side in the vehicle width direction and extending forward. On the inclination wall 21, a plurality in an up-down direction of diagonal reinforcement beads 24 are formed, that extend in a substantially horizontal direction. The diagonal reinforcement member 23 has an inclination lower wall 22 in a triangle-like shape in a top view, standing from a lower end edge of the inclination wall 21 towards the inner side in the vehicle width direction.

From an inner side edge of the inclination lower wall 22 in the inner side in the vehicle width direction, a lower joint flange 22a stands downwardly. From a rear end edge of the inclination wall 21, a rear joint flange 21a stands backward. The lower joint flange 22a and the rear joint flange 21a are joined to the outer side wall surface 6c of the front side frame 6 by welding.

From a front end edge of the inclination lower wall 22, a front joint flange 22 stands upwardly. The front joint flange 22b is joined to a back surface (a reverse surface) of an inner side portion 31a of the front wall 31 of the connection frame 20 by welding.

From the front end edge of the inclination lower wall 22, an inward front joint flange 21b stands towards the inner side in the vehicle width direction. The inward front flange is joined to a back surface (a reverse surface) of an inclination portion 31c of the front wall 31 of the connection frame 20 by welding.

From an upper end edge of the inclination wall 21, an upper joint flange 21c stands toward the outer side in the vehicle width direction. An inner side portion 21c1 of the upper joint flange 21c is joined to a lower surface of a frame connection flange 6d extending in the substantially horizontal direction in an upper outer side of the front end portion 6a of the front side frame 6 by welding. An outer side portion 21c2 of the upper joint flange 21c is joined to a lower surface of an upper wall 36 of the connection frame 20 by welding.

Hereinafter, description is made with reference to FIG. 2 to FIG. 7. The connection frame 20 is formed so that a front-back width of an inner side portion to which the front end portion 6a of the front side frame 6 is connected from the outer side in the vehicle width direction is relatively large, and the front-back width of an outer side portion to which the front end portion 11a of the upper member 11 is connected from the inner side in the vehicle width direction.

That is to say, a shape of the connection frame 20 is formed so that a side in contact with the front side frame 6 is longer than a side in contact with the upper member 11.

The connection frame 20 includes a front lower reinforcement member 33 configured to be the front wall 31 and a lower wall 32, a rear portion reinforcement member 35 configured to be a rear wall 34 and an upper reinforcement member 37 configured to be an upper wall 36.

The front wall 31 extends from outer side edge of the front end 6b of the front side frame 6 toward the outer side in the vehicle width direction. The front wall 31 has, in sequence from the front side frame 6 side, the inner side portion 31a along the vehicle width direction, an outer side portion 31b along the vehicle width direction and being displaced backward from the inner side portion 31a, and the inclination portion 31c between the inner side portion 31a and the outer side portion 31b, inclining so that the outer in the vehicle width direction, the more it is positioned backward. The outer side portion 31b of the front wall 31 extends so as to overlap the front end 11b of the upper member 11, and joined to the front end 11b of the upper member 11 by welding. An upper portion of the front wall 31 extends out rather upwardly than the upper wall 36 and configured to be a front wall upper joint flange 31d to which a front portion of the upper reinforcement member 37 is joined.

The lower wall 32 extends from outer side edge of the front end portion 6a of the front side frame 6 toward the outer side in the vehicle width direction. The lower wall 32 has, in sequence from the front side frame 6 side, an inner side portion 32a disposed substantially horizontally, an outer side portion 32b disposed substantially horizontally, being displaced rather upwardly than the inner side portion 32a, and an inclination portion 32c between the inner side portion 32a and the outer side portion 32b, inclining so that the outer in the vehicle width direction, the more it is positioned upwardly. The outer side portion 32b of the front wall 32 extends so as to overlap a lower surface of the front end portion 11a of the upper member 11, and joined to the lower surface of the front end portion 11a of the upper member 11 by welding.

A part of the inner side portion 32a and the inclination portion 32c of the lower wall 32 are joined to the lower surface of the inclination lower wall 22 of the diagonal reinforcement member 23.

The rear wall 34 extends along the vehicle width direction between an inner side wall surface 11c of the front end portion 11a of the upper member 11 and a middle portion of the inclination wall 21 of the diagonal reinforcement member 23. An upper portion of an outer side portion of the rear wall 34 extends out rather upwardly than the upper wall 36, and is configured to be a rear wall upper joint flange 34a to which a rear portion of the upper reinforcement member 37 is joined. A lower edge portion of the rear wall 34 is formed along the lower wall 32. From the lower edge portion of rear wall 34, a rear wall lower joint flange 34b stands forwardly. The rear wall lower joint flange 34b is joined to a lower surface of the lower wall 32 by welding. From an inner side edge of the rear wall 34, a rear wall inner joint flange 34c stands along the inclination wall 21. The rear wall inner joint flange 34c is joined to an inclination surface 21d in the outer side in the vehicle width direction of the inclination wall 21 by welding. From an outer side edge of the rear wall 34, a rear wall outer joint flange 34d stands along the inner side wall surface 11c of the upper member 11. The rear wall outer joint flange 34d is joined to the inner side wall surface 11c of the upper member 11 by welding. On the rear wall 34, a plurality in an up-down direction of rear reinforcement beads 38 are formed, that extend in a substantially horizontal direction. Each of the rear reinforcement bead 38 is respectively formed to be in the same height as each of the diagonal reinforcement bead 24 of the inclination wall 21 of the diagonal reinforcement member 23. Each of the rear reinforcement bead 38 and each of the diagonal reinforcement beads 24 are disposed so as to be continuous with each other.

The upper wall 36 is provided between an outer side edge of the front end portion 6a of the front side frame 6 and an inner side edge of the front end portion 11a in the vehicle width right-left direction, and is provided between an upper edge portion of the front wall 31 and an upper edge portion of the rear wall 34 as well as a back side of an upper edge portion of the inclination wall 21 in the front-back direction. That is to say, the upper wall 36 is provided so that a front side of the upper wall 36 is in contact with the upper edge portion of the front wall 31, a back side of the upper wall 36 is in contact with both of the upper edge portion of the rear wall 34 and the upper edge portion of the inclination wall 21.

From a front edge of the upper wall 36, an upper wall front joint flange 36a stands upwardly. The front wall upper joint flange 31d is joined to the upper wall front joint flange 36a by welding. From an outer side edge of the upper wall 36, an upper wall outer joint flange 36b stands upwardly. The upper wall outer joint flange 36b is joined to the inner side wall surface 11c of the front end portion 11a of the upper member 11 by welding. From an outer side of a back edge of the upper wall 36, an upper wall rear joint flange 36c stands upwardly. The rear wall upper joint flange 34a is joined to the upper wall rear joint flange 36c by welding. An inner side portion of the upper wall 36 extends in the inner side in the vehicle width direction so as to overlap the frame connection flange 6d of the front side frame 6 and combined with the lower surface of the frame connection flange 6d by fastening with a plurality of bolts B1.

In the front side frame 6 side, the connection frame 20 forms an inner side closed cross section structure portion 41, that is relatively large in the front-back width, and is hollow and in a triangle-like shape in the top view, including the diagonal reinforcement member 23 On the rather the upper member 11 side than the inner side closed cross section structure portion 41 (in other words, between the inclination surface 21d in the outer side in the vehicle width direction of the diagonal reinforcement member 23 and the inner side wall surface 11c in the outer side in the vehicle width direction of the upper member 11), the connection frame 20 forms an outer side closed cross section structure portion 42, that is relatively small in the front-back width, and is hollow and extends in the vehicle width direction with a rectangular like cross section. Because of both of the closed cross section structure portions 41 and 42, which are continuous with each other, the strength of the connection frame 20 is enhanced. And, even when there is an input to the front end portion 11a of the upper member 11 at the time of narrow offset collision, a load transmission amount to the front side frame 6 is enlarged.

That is to say, in a case where the connection frame 20 has an open cross section structure, the connection frame 20 is easy to deform so as to fall backward and a load transmission amount to the front side frame 6 is small. On the contrary to this, the connection frame 20 of the present embodiment has the diagonal reinforcement member 23 has the diagonal reinforcement member 23 like a supporting strut which transmit an input of the upper member 11 side linearly to the front side frame 6. Also, the inner side closed cross section structure portion 41 that is relatively large in the front-back width is disposed on a base end side of backward falling deformation of the connection frame 20. And in an outer side thereof, a box-structure of the closed cross section (a box-shaped reinforcement portion, the outer side closed cross section structure portion 42) is continued. In this way, falling deformation of the connection frame 20 is restrained and the amount of the load transmission to the front side frame 6 is enlarged. On the other hand, the outer closed cross section structure portion 42 enables to secure a rear space by decreasing the front-back width thereof, compared to the inner side closed cross section structure 41.

As described above, in the vehicle front structure in the embodiment above, the connection frame 20 provided over between the front end portion 6a of the front side frame 6 and the front end portion 11a of the upper member 11 includes the diagonal reinforcement member 23 extending forward from the outer side wall surface 6c in the vehicle width direction of the front side frame 6 while inclining toward the outer side in the vehicle width direction, and the outer closed cross section structure portion 42 extending over the space between the inclination surface 21d on the outer side in the vehicle width direction of the diagonal reinforcement member 23 and the inner side wall surface 11c in the vehicle width direction of the upper member 11 and having a rectangular-like closed cross section.

In the configuration above, even when a collision input is given to the front end portion 11a of the upper member 11 at the time of narrow offset collision, the connection frame 20 is given strength by the diagonal reinforcement member 23 and the outer closed cross section structure portion 42, deformation of the connection frame 20 is restrained to a maximum extent. In this way, as the connection frame 20 transmits the load to the front side frame 6 firmly while being bent like falling backward, an absorption amount of the collision load at the front side frame 6 is increased, and accordingly it is possible to enhance the impact absorption characteristic of a front portion of a vehicle body. Also it is possible to enhance the layout flexibility of automotive components as being possible to effectively utilize the rear space of the connection frame 20 as a component disposition space, compared to a case in which a diagonal connection member laid between a side surface of the front side frame 6 and a front end of the upper member 11 is used.

The vehicle front structure in the embodiment above includes the front bumper beam 14 configured to be connected to the front end portion 6a of the front side frame 6, and the connection frame 20 includes the front lower reinforcement member 33 extending over a space between the front end portion 6a of the front side frame 6 and the front end portion 11a of the upper member 11, the front lower reinforcement member 33 is configured to be the front wall 31 the outer closed cross section structure portion 42; the diagonal reinforcement member 23 includes the inward front joint flange 21b bent from the front end portion of the diagonal reinforcement member 23 toward the inner side in the vehicle width direction and configured to be joined to the front lower reinforcement member 33.

In the configuration above, the inward front joint flange 21b of the front end portion of the diagonal reinforcement member 23 is joined to the front end portion 6a of the front side frame 6, that is, a connecting place of the front bumper beam 14 which receive the input at the time of a front collision, by being bent toward the inner side in the vehicle width direction. In this way, the inward front joint flange 21b contributes to support the load input in a rather offset manner from the front bumper beam 14 to the front portion reinforcement member. And accordingly, it is possible to transmit the load to the front side frame 6 via the diagonal reinforcement member 23 effectively.

The vehicle front structure in the embodiment above includes the rear portion reinforcement member 35 configured to be the rear wall 34 of the outer closed cross section structure portion 42, and the rear portion reinforcement member 35 includes the rear reinforcement beads 38. And the diagonal reinforcement member 23 includes the diagonal reinforcement beads 24 extending in the horizontal direction. And, the rear reinforcement beads 38 and the diagonal reinforcement beads 24 are disposed so as to continue in the connecting portion of the rear portion reinforcement member 35 and the diagonal reinforcement member 23.

In the configuration above, as the diagonal reinforcement member 23 and the rear portion reinforcement member 35 are provided with bead shape extending in the horizontal direction, corresponding with each other. Thus, the strength of the diagonal reinforcement member 23 and the rear portion reinforcement member 35 by itself is enhanced. Also, the diagonal reinforcement member 23 is hard to buckle, and the rear portion reinforcement member 35 is hard to break at the connecting portion with the diagonal reinforcement member 23 against both of the compression load in the extending direction of the diagonal reinforcement member 23 and the load in the falling direction of the upper member 11 side of the connection frame 20 backward and toward the inner side when the load by the front collision is applied from the front direction. And accordingly, it is possible to restrain deformation of the connection frame 20 to a maximum extent.

The vehicle front structure in the embodiment above includes the upper reinforcement member 37 extending over the space between the outer side portion in the vehicle width direction of the front side frame 6 and the inner side portion of the vehicle width direction of the upper member 11, and the upper portion reinforcement member 37 is configured to be the upper wall 36 of the outer closed cross section structure portion 42, the inner side portion of the upper reinforcement member 37 and the outer side portion of the front side frame 6 are fastened by the bolt B1.

In the configuration above, the connecting portion of the front side frame 6 and the connection frame 20, which is the starting point of falling of the connection frame 20 backward is combined by bolt fastening of higher fixing strength than welding in general. In this way, the upper reinforcement member 37 is hard to be stripped off from the front side frame 6. And accordingly, it is possible to provide sufficient strength to the connection frame 20 for the front collision load including the load of falling backward.

In addition, the present invention is not limited to the embodiments described above. For example, structures of dividing the connection frame 20, joining methods or the like thereof may be modified arbitrarily.

And as configurations in the embodiments described above are one of examples of the present invention, various modifications are possible without departing from the scope of the invention, such as replacing those elements of the embodiments with commonly known elements.

REFERENCE SIGNS LIST

1 VEHICLE
1A VEHICLE BODY
6 FRONT SIDE FRAME
6a FRONT END PORTION
6c OUTER SIDE WALL SURFACE
11 UPPER MEMBER
11a FRONT END PORTION
11c INNER SIDE WALL SURFACE
14 FRONT BUMPER BEAM (FRONT BUMPER MEMBER)
20 CONNECTION FRAME
21b INWARD FRONT JOINT FLANGE (FLANGE)
21d INCLINATION SURFACE
23 DIAGONAL REINFORCEMENT MEMBER
24 DIAGONAL REINFORCEMENT BEAD (DIAGONAL BEAD SHAPE)
31 FRONT WALL (FRONT PORTION WALL SURFACE)
33 FRONT LOWER REINFORCEMENT MEMBER (FRONT PORTION REINFORCEMENT MEMBER)
34 REAR WALL (REAR PORTION WALL SURFACE)
35 REAR PORTION REINFORCEMENT MEMBER
36 UPPER WALL (UPPER PORTION WALL SURFACE)
37 UPPER REINFORCEMENT MEMBER
38 REAR REINFORCEMENT BEAD (REAR PORTION BEAD SHAPE)
42 OUTER SIDE CLOSED CROSS SECTION STRUCTURE PORTION (BOX-SHAPED REINFORCEMENT PORTION)
B1 BOLT

The invention claimed is:
1. A vehicle front structure comprising:
front side frames of right and left extending over a front-back direction of a vehicle;
upper members being provided in an outer side in a vehicle width direction of the front side frames and extending over the front-back direction of the vehicle; and
connection frame extending over a space between a front end portion of the front side frame and a front end portion of the upper member,
wherein the connection frame includes:
a diagonal reinforcement member extending forward from an outer side wall surface in the vehicle width direction of the front side frame while inclining toward the outer side in the vehicle width direction; and
a box-shaped reinforcement portion extending over a space between an inclination surface on the outer side in the vehicle width direction of the diagonal reinforcement member and an inner side wall surface in the vehicle width direction of the upper member and having a closed cross section, the connection frame includes a front portion reinforcement member extending over a space between the front end portion of the front side frame and the front end portion of the upper member, the front portion reinforcement member and the diagonal reinforcement member are configured to be a front portion wall surface provided along the vehicle width direction of the box-shaped reinforcement portion, the connection frame includes an upper portion reinforcement member extending over a space between an outer side portion in the vehicle width direction of the front side frame and an inner side portion of the vehicle width direction of the upper member, the upper portion reinforcement member is configured to be an upper portion wall surface of the box-shaped reinforcement portion, an inner side closed cross section structure portion which is hollow and is a triangle-like shape in a top view is formed by the front portion reinforcement member, the upper portion reinforcement member, the outer side of the front side frame and the diagonal reinforcement member, and an outer side closed cross section structure portion which is hollow and extending in the vehicle width direction is formed by the front portion reinforcement member, the upper portion reinforcement member, the outer side of the diagonal reinforcement member and the inner side of the upper member.

2. A vehicle front structure according to claim 1, further comprising:
a front bumper member configured to be connected to the front end portion of the front side frame,
the diagonal reinforcement member includes a flange bent from a front end portion of the diagonal reinforcement member toward an inner side in the vehicle width direction and configured to be joined to the front portion reinforcement member.

3. A vehicle front structure according to claim 2, further comprising:
a rear portion reinforcement member configured to be a rear portion wall surface provided along the vehicle width direction of the box-shaped reinforcement portion, wherein the rear portion reinforcement member includes a rear portion bead shape extending in a horizontal direction,
the diagonal reinforcement member includes a diagonal bead shape extending in the horizontal direction, and
the rear portion bead shape and the diagonal bead shape are disposed so as to continue in a connecting portion of the rear portion reinforcement member and the diagonal reinforcement member.

4. A vehicle front structure according to claim 3, wherein the inner side portion of the upper portion reinforcement member and the outer side portion of the front side frame are fastened by a bolt.

5. A vehicle front structure according to claim 2, wherein the inner side portion of the upper portion reinforcement member and the outer side portion of the front side frame are fastened by a bolt.

6. A vehicle front structure according to claim 1, further comprising:
a rear portion reinforcement member configured to be a rear portion wall surface provided along the vehicle width direction of the box-shaped reinforcement portion, wherein the rear portion reinforcement member includes a rear portion bead shape extending in a horizontal direction,
the diagonal reinforcement member includes a diagonal bead shape extending in the horizontal direction, and
the rear portion bead shape and the diagonal bead shape are disposed so as to continue in a connecting portion of the rear portion reinforcement member and the diagonal reinforcement member.

7. A vehicle front structure according to claim 6, wherein the inner side portion of the upper portion reinforcement member and the outer side portion of the front side frame are fastened by a bolt.

8. A vehicle front structure according to claim 1, wherein the inner side portion of the upper portion reinforcement member and the outer side portion of the front side frame are fastened by a bolt.

* * * * *